United States Patent [19]
Kobori et al.

[11] 3,921,187
[45] Nov. 18, 1975

[54] PHOTOGRAPHIC CAMERA HAVING ELECTRIC SHUTTER

[75] Inventors: Toshio Kobori, Sakai; Toru Matsui, Osaka, both of Japan

[73] Assignee: Minolta Camera Kabushiki Kaisha, Osaka, Japan

[22] Filed: June 28, 1974

[21] Appl. No.: 484,372

[30] Foreign Application Priority Data
July 2, 1973  Japan.............................. 48-73616
July 9, 1973  Japan.............................. 48-76541
July 9, 1973  Japan.............................. 48-76542

[52] U.S. Cl. .................. 354/50; 354/237; 354/268
[51] Int. Cl.$^2$ ........................................ G03B 17/40
[58] Field of Search ........................ 354/237–238, 354/266–268, 256, 258, 48, 50

[56] References Cited
UNITED STATES PATENTS

| | | | |
|---|---|---|---|
| 3,427,943 | 2/1969 | Leibungut........................... | 354/268 |
| 3,625,128 | 2/1969 | Nomura et al..................... | 354/237 X |
| 3,667,367 | 6/1972 | Miyagawa.......................... | 354/238 |
| 3,810,227 | 5/1974 | Tanaka.............................. | 354/266 X |

Primary Examiner—Joseph F. Peters, Jr.
Assistant Examiner—James LaBarre
Attorney, Agent, or Firm—Wolder & Gross

[57] ABSTRACT

A photographic camera having an electric shutter is provided with a locking member for a shutter release member and an electric power source switch connected between an electric power source and an electric control circuit adapted to control the exposure electrically. The electric power source switch is adapted to be automatically opened when the camera is not in use for taking a picture, and closed when the locking member is uncoupled to release the shutter from locked condition for operation, the closing of the switch and the release of the shutter being effected by the hands of the user in gripping the camera for manual photographing. On the other hand, in case a self-timer incorporated in the camera is set for self-timer photographing mode, the aforesaid electric power source switch is adapted to be closed due to the release of the locked shutter from the locking member, said releasing operation being effected in response to the shutter releasing operation of the self-timer device. The aforesaid closing operation of the electric power source switch is completed prior to the shutter releasing operation due to the self-timer device and maintained until termination of the exposure.

11 Claims, 22 Drawing Figures (A)

(A)

(B)

(B)

PHOTOGRAPHIC CAMERA HAVING ELECTRIC SHUTTER

BACKGROUND OF THE INVENTION

This invention relates to a photographic camera having an electric shutter and an electric power source switch adapted to open or close the connection between the electric power source and an electric control circuit for the shutter. The electrical control circuit automatically regulates the shutter speed and therefore the exposure time in accordance with the degree of illumination of the object being photographed and sensed by a built-in photoelectric cell.

The control of an electrically operated camera shutter is generally effected by means of an electromagnet adapted to be energized by an electric control circuit. The electric power consumption used for this purpose is usually considerable, resulting in a high drain on the power supply, normally in the form of battery cells.

Accordingly, if a camera is stored with the connection between its electric power source and a load not being interrupted, then the electric cells will be consumed in a short period of time, with the result that the camera will not be ready for use when a user subsequently wishes to take a picture. For this reason, it is known to provide an electric power source switch for opening and closing the aforesaid connection.

However, if such an electric power source switch is left closed while storing the camera for some reason or another, then the electric power source will be consumed immediately. On the other hand, if the shutter releasing operation is effected in photographing, with the aforesaid switch being left opened, then the exposure will not be effected.

It is accordingly an object of the present invention to provide a photographic camera having an electric shutter, in which an electric power source switch, connected between an electric power source and an electric control circuit, is positively opened when the camera is not in use for photographing, while the electric power source switch is positively closed when the camera is used for photographing.

It is another object of the present invention to provide a photographic camera having an electric shutter, in which an electric power source switch, connected between the electric power source and the electric control circuit, is opened and a locking member locks the releasing operation of a shutter when the camera is not in use for photographing, while the electric power source switch is closed when the camera is used for photographing and the aforesaid locking member simultaneously releases the locked condition of the shutter.

It is a further object of the present invention to provide a photographic camera having an electric shutter, which camera is provided with an electric power source switch which has a tendency to open and is connected between an electric power source and an electric circuit, a locking member having a biased tendency to normally lock the shutter release member, and a self-timer device, whereby when the camera is held in the hands for manual photographing, the electric power source switch will be closed and the locking member will be moved to release the locked condition of the shutter. On the other hand, when the self-timer device is used and the camera is not held in the hands, the release of the self-timer device from its cocked position will cause said locking member to release the locked condition of the shutter and at the same time electric power source switch will be closed against its normally open tendency prior to release of the shutter by the self-timer device. This closed condition of the electric power source switch is released and the shutter again locked by the locking member only in response to termination of the exposure.

These and other objects and features of the present invention will be clear from a reading of the ensuing part of the specification in conjunction with the accompanying drawings which indicate the preferred embodiments of the present invention.

SUMMARY OF THE INVENTION

According to the present invention, there is provided a photographic camera having an electric shutter, which camera is provided with a locking member adapted to lock the shutter against release, and an electric power source switch adapted to cooperate with the aforesaid locking member and located on the outer surface of the camera body, said electric power source switch being connected between an electric power source and an electric control circuit and adapted to be manually actuated by the hand of the user when the camera is held in normal position for photographing. The camera is further provided with an actuating member for said electric power source switch which is depressed during the user's holding operation of the camera to close the electric power source switch and release the shutter from locked condition.

According to another aspect of the present invention, there is provided a photographic camera incorporating a self-timer device, wherein a self-timer cocking member is movable between a rest position and a cocked position, and is functionally associated with the electric power source switch provided on the outer surface of the camera body, whereby when the cocking member is in the rest position, the locking member locks the shutter and causes the electric power source switch to be opened. When the cocking member is brought to its cocked position and then released, the shutter is released from its locked condition and the electric power source switch is closed prior to the time that the self-timer device releases the camera shutter.

The aforesaid electric power source switch is biased to open, and the locking member operatively associated with the electric power source switch or its actuating member locks the shutter, when the camera is not held by hands. This prevents the electric power source current from flowing to an electric control circuit and hence prevents the consumption of electric current when the camera is not in use for photographing, while the locking member prevents the releasing operation of the shutter when the electric control circuit is not fed with electric current. Thus, the user's gripping of the camera by his hands causes the electric control circuit to be automatically connected to the electric power source, thereby enabling the control of the shutter speed, whereupon the locked condition of the shutter is released to permit manual photographing.

On the other hand, a camera need not be held in the hands during photographing, and it is often desirable that the camera be supported on a tripod. In this latter case, however, a user may hold a camera in the same manner as in the manual photographing, i.e., holding the camera by hands, if the user is accessible to the camera, for the purpose of closing the electric power source switch. In other situations, as in the case of self-timer photographing, the user is not accessible to the camera when taking a picture. For this reason, according to the present invention, the manipulating or cocking member of the self-timer device is functionally associated with the electric power source switch or its actuating member, whereby the shutter releasing operation of the cocking member subsequent to its movement to the cocked position will cause the electric power source switch to be positively closed prior to the exposure, thereby connecting the electric power source to the electric control circuit, and whereby upon termination of the exposure, the aforesaid electric power source switch will be opened and the locking member will engage the shutter release member in a locked condition.

DETAILED DESCRIPTION OF THE INVENTION

Figure 1:
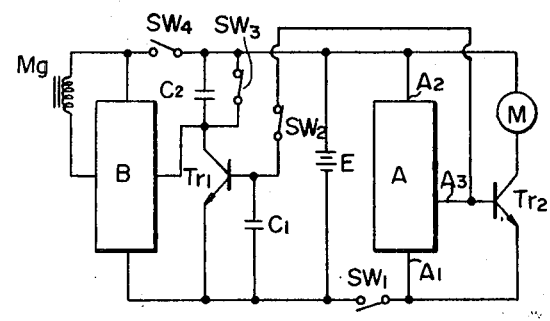
FIG. 1 is a circuit diagram showing one embodiment of an electric exposure time control circuit used in the present invention.

The control circuit shown in FIG. 1 is adapted for use not only in the usual camera which is held in hand during photographing, but also in a camera equipped with built-in self-timer mechanism.

The circuit shown in FIG. 1 is illustrated as including a component which measures the light of the photographic object transmitted through a known objective lens. In this circuit, a conventional light measuring circuit A, including a photoelectric element, has its input terminals A1 and A2 connected across an electric power source E through an electric power source switch SW1. The light measuring circuit A has an output terminal A3 at which there is produced a voltage in proportion to the logarithmic value of a photoelectric current produced by means of the light incident upon the aforesaid photoelectric element. The output terminal A3 is connected to the base of a transistor Tr2, the collector of which is connected to a meter M to cause the latter to indicate the degree of brightness of the photographic object. A storing capacitor C1 is electrically charged by means of a normally closed switch SW2 which is adapted to be opened during the releasing operation of the camera shutter, prior to the interruption of part of the light from the photographic object upon the photoelectric element.

The stored voltage in the storing condensor C1 is fed as an input to the base of a transistor Tr1, while there will be produced an electric current adapted to anti-logarithmically convert the input voltage at its collector.

A normally closed trigger switch SW3 is adapted to be opened at the commencement of the shutter exposure movement to charge a timing condensor C2. Voltages at both terminals of condensor C2 are fed as inputs to a switching circuit B upon closing of a normally open switch SW4. This switch SW4 is closed during the shutter releasing operation and is maintained closed during the time in which a movable mirror is in its swung-up position. Connected to the output terminal of switching circuit B is an electromagnet Mg adapted to terminate the exposure.

The electric exposure time control circuit shown in FIG. 1 thus includes a light measuring circuit A and a switching circuit B, both of which are connected in parallel to a power source, as well as the switch SW4, which, as previously described, is adapted to be closed during operation of the camera shutter. The circuit of FIG. 2, to be presently described, differs in that it feeds the current from an electric power source E through a single electric power source switch to both the light measuring circuit A and switching circuit B, and the switch SW4 is eliminated.

Figure 3:
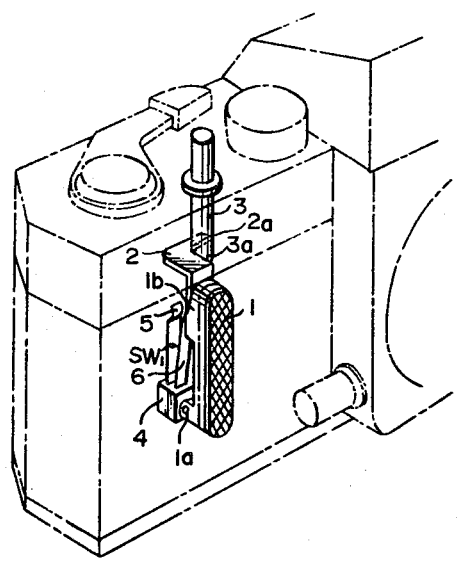
FIG. 3 is a perspective view of the essential operating parts of a first embodiment of camera mechanism made according to the present invention.

In FIG. 3 there is shown a first embodiment of switch and lock member components which are used in association with the circuit of FIG. 1. In this embodiment, the electric power source switch is adapted to be closed by the action of the user's hands in holding the camera in the normal manner for photographing.

As shown in FIG. 3, the electric power source switch SW1 includes a switch actuating member 1 in the form of a plate made of insulating material, the plate 1 being journalled within the body proper of a camera by means of a pivot shaft 1a. The face portion of plate 1 projects outwardly of the front surface of the camera body, and as indicated, is so positioned that it is engaged by the fingers of the user's hand and pressed inwardly when the user grips the camera body in the normal manner for photographing. A lock member 2 for the shutter release is integrally formed on the inner actuating surface 1b of the switch actuating plate 1 and faces the interior of the camera.

The switch SW1 comprises a stationary contact arm 5 rigidly secured to an insulating block 4 mounted on the body of the camera, and a movable contact arm 6 resiliently biased to a switch open position in which it is spaced from the stationary contact arm 5 and presses against the actuating surface 1b of the switch actuating plate 1.

A bent terminal portion 2a of the release lock member 2 is positioned to engage a notch 3a in the shutter release rod 3 of the camera, and is normally in engagement therewith to lock the rod 3 in inoperative position.

It will thus be seen in FIG. 1 that since electric power source switch SW1 and switch SW4 are normally open, the electric power source E is completely disconnected from its load and there is no electric current flow in the circuit. In this inoperative condition of the camera, the bent portion 2a of release lock member 2 engages the notch 3a of shutter release rod 3 to lock the same, so that switch SW4 is maintained in open condition. Thus, when actuating plate 1 is depressed by the hand of the user holding the camera for manual photographing, the switch SW1 will be closed, and simultaneously the bent portion 2a of release lock member 2 will be disengaged from notch 3a, releasing the rod 3 from its locked condition, so that the rod 3 can be lowered.

Figure 4:
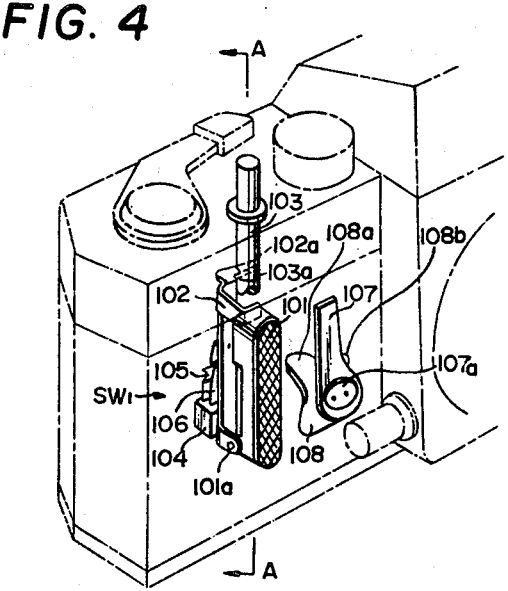
FIG. 4 is a perspective view of the essential operating parts of a second embodiment of the invention.
Figure 5:
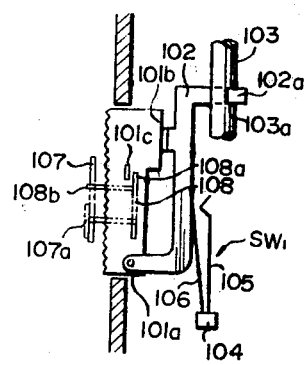
FIG. 5 is a cross-sectional view taken along the line A—A of FIG. 4, and showing the operating parts of FIG. 4 in their position when the camera is in use.
Figure 6:
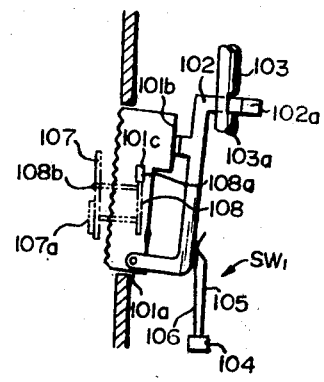
FIG. 6 is a cross-sectional view similar to FIG. 5, but showing the operating parts of FIG. 4 in their position when the camera is not in use.

FIGS. 4, 5 and 6 illustrate a second embodiment of the switch and lock mechanism of the present invention which also utilizes the circuit of FIG. 1, but in this instance, is adapted to operate the electric power source switch without manual assistance by the user, for example, when the camera is remotely mounted on a tripod or the like for self-timer exposure.

In FIG. 4, the switch and shutter release rod parts are generally similar to those of the embodiment of FIG. 3, and are similar numbered as part of a "100" series. The mechanism differs in that the locking member 102 is made separate from the actuating plate 101, having an abutting engagement with the actuating surface 101b, and is journalled within the camera body by means of the same pivot shaft 101a which pivotally mounts the actuating plate 101. The actuating plate 101 is made of substantial thickness and is formed with a locking recess 101c in one side thereof, as shown in FIGS. 5 and 6.

The camera shown in FIG. 4 includes a conventional self-timer device (not shown) having an exposed cocking and setting lever 107 pivotally mounted in the camera body by means of a shaft 107a, and shown in FIG. 4 in its uncocked position of rest. The lever 107 is adapted to be rotated in a counter-clockwise direction so as to cock the self-timer, upon which it tends to return to its rest position under the influence of the self-timer mechanism. In the course of such return movement, the self-timer mechanism releases the camera shutter in the usual manner.

Associated with the lever 107, internally of the camera case, is an actuating lever 108 which is mounted for rotation about shaft 107a and has a portion 108b which projects exteriorly of the camera case. The actuating lever 108 has a tendency to rotate in a counter-clockwise direction under the influence of a weak biasing spring (not shown) so as to maintain the projecting portion 108b in constant engagement with cocking lever 107. The actuating lever 108 also has a radially projecting extension portion 108a positioned to engage the actuating plate 101. Thus, when actuating plate 101 is depressed, its locking recess 101c is brought forwardly to a position in which the projection 108a will enter and fit within the locking recess 101c to hold the actuating plate 101 in its depressed position.

The embodiment of FIG. 4 may be used manually without recourse to the self-timer mechanism, in the same manner as in the previous embodiment, the switch actuating plate 101 being depressed by the user's fingers when the camera is held by the hands for manual exposure operation. Such depression of actuating plate 101 closes the electric power source switch SW1, the lock member 102 being moved by plate 101 and pushing movable switch contact arm 106 into engagement with fixed contact arm 105 as shown in FIGS. 5 and 6. At the same time, movement of lock member 102 brings its bent terminal extension 103a out of holding engagement with a notch 103a in the shutter release rod 103. When the camera is released from being held in the hands and the plate 101 is not locked in its depressed condition, the electric power source switch SW1 will be reopened and the shutter relocked in the same manner as in the first embodiment, so that there will be no drain on the power source.

When it is desired to use the self-timer mechanism of the FIG. 4 embodiment, by turning the cocking lever 107, the switch actuating plate 101 is first depressed and then the lever 107 is rotated in a counter-clockwise direction. This causes the projection 108a of actuating lever 108 to engage within the locking recess 101c of actuating plate 101, as shown in FIG. 6, whereby actuating plate 101 is held in depressed condition with switch SW1 closed and shutter rod 103 released. When the self-timer is actuated in this condition, cocking lever 107 is rotated in a clockwise direction and the actuation lever 108 will follow this movement under influence of its biasing spring. The parts are so dimensioned and arranged that the shutter is released by the self-timer mechanism immediately before the projection 108a is disengaged from the locking recess 101c, so that the switch actuating plate 101 is still depressed and the power source switch SW1 is closed at the time of shutter operation. Thereafter, the projection 108a disengages from locking recess 101c, and the switch plate 101 returns to its extended position, opening switch SW1 and causing locking of the shutter release rod 103 as shown in FIG. 5, while the cocking lever 107 is stopped in its rest position shown in FIG. 4.

In this embodiment, it is imperative that the actuating plate 101 be manually depressed prior to cocking the self-timer. Failure to depress the actuating plate at this time will result in the self-timer lever 107 being cocked without the projection 108a engaging the locking recess 101c to hold the actuating plate in depressed position, and without the switch SW1 being closed. This will allow subsequent operation of the self-timer mechanism, but will not result in operation of the shutter.

Figure 2:
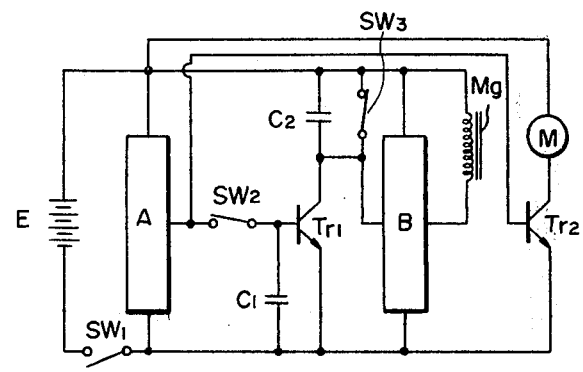
FIG. 2 is a circuit diagram showing another embodiment of an electric exposure time control circuit which may be used in the present invention.

Furthermore, in the event that the electrical control circuit of FIG. 2 is used in the embodiment of FIGS. 4, 5 and 6, the electric power source switch SW1 is required to be maintained closed until the exposure is fully terminated. Thus, the exposure should be completed before the actuating plate is released from its locked depressed position. However, the switch plate releasing operation is in no way dependent upon exposure termination, so that where longer exposure times are made, the exposure may not be completed before the actuating plate 101 is released and the power source switch SW1 opened. This will result in failure to effect optimum exposure.

Figure 7:
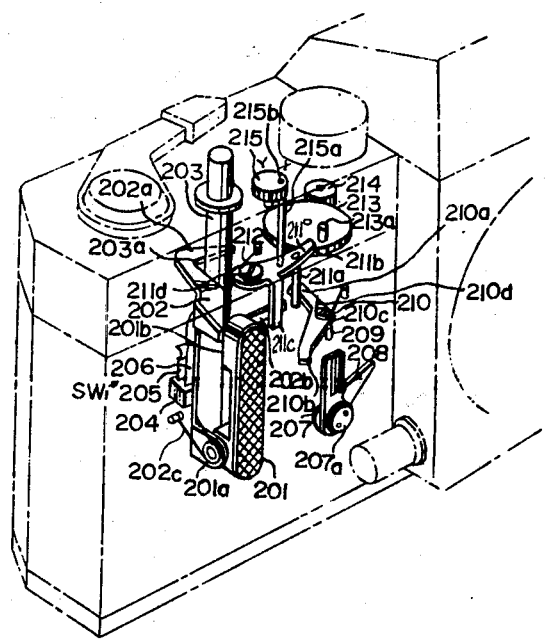
FIG. 7 is a perspective view of the essential parts of a third embodiment of camera mechanism according to the present invention.
Figure 8:
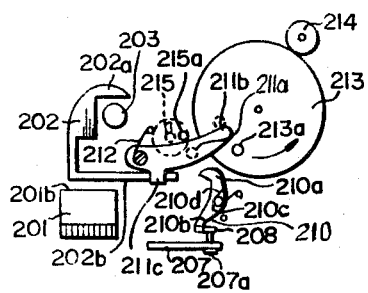
FIG. 8 is a top plan view of the mechanism shown in FIG. 7, at the time of self-timer photographing.

The third embodiment of the present invention as shown in FIGS. 7 and 8 is directed to avoiding the aforesaid shortcomings and thus enables the use of the electric shutter control shown in FIG. 2. The points different from the second embodiment with respect to members 101 to 107 are that the shutter release lock lever 202 is formed with an arm 202b which is biased by a spring 202c in a direction to abut the actuating surface 201b of a actuating plate 201, this biasing force also urging the bent portion 202a of release lock lever 202 into engagement with a notch portion 203a in the release rod 203, and urging the lever 202 out of contact with the movable switch arm 206, so that the normally open switch SW1 is maintained opened. In addition, the length of arm 202b is such that it engages a drive member 211.

The embodiment of FIGS. 7 and 8 is used in a camera having a self-timer mechanism which is set by a cocking lever 207 which normally has a rest position shown in FIG. 7. The cocking lever 207 is formed with an actuating arm 208 adapted to rotate integrally therewith about a shaft 207a.

An arresting lever 210 is rotatably journalled in the body proper of a camera by means of a shaft 210c and is biased by spring 210d to rotate in the counter-clockwise direction into abutment with a stop pin 209. The arm 210b of arresting lever 210 will engage the aforesaid actuating arm 208, when the cocking lever 207 is rotated from its rest position to the cocked position as shown in FIG. 8, whereby arm 210b will be rotated in a clockwise direction against the biasing force of spring 210d thereon.

A drive member 211 is journalled in the body proper of a camera by means of a shaft 211d and is tensioned to rotate in a counter-clockwise direction under the action of a spring 212 which is stronger than the aforesaid spring 202c, while a pin 211a carried by drive member 211, is engageable with a hooked end portion 210a of arresting member 210. In addition, a depending projection 211c engages arm 202b of lock lever 202, while the end portion 211b, the lever arm of member 211, is positioned in the vicinity of the terminal of the path of rotation of upstanding pin 213a of releasing gear 213 which meshes with a gear 214 of the rear curtain of the focal plane shutter serving as a shutter closing member. The pin 213a on the aforesaid releasing gear 213 rotates through about 360° in the counter-clockwise direction, during the period in which the rear curtain travels from the shutter-cocked position shown in FIG. 7 and completes its travelling, after releasing of the shutter. The pin 213a will engage end portion 211b of drive member 211 at the terminating portion of its rotation to thereby rotate drive member 211 in the clockwise direction against the action of spring 212.

Designated 215 is a manual releasing member which is rotatable relative to the body proper of a camera and is formed with a depending eccentric pin 215a. Thus, when an index 215b is aligned with the graduation Y of the camera body, eccentric pin 215a is completely retracted from drive member 211. On the other hand, when index 215b is on the graduation X, the pin 215a engages drive member 211 to thereby rotate same in a clockwise direction against the action of spring 212.

FIG. 7 shows the camera parts in a position in which the shutter is cocked and the self-timer cocking member 208 is in its rest position. To set the self-timer mechanism, the cocking lever 208 is rotated counter-clockwise to the position shown in FIG. 8. This moves actuating lever 208 to a position in engagement with the arm end 210b of arresting lever 210 to rotate same in a clockwise direction as viewed in FIG. 7, such that the retained condition of the pin 211a by the hooked portion 210a will be released, whereupon drive member 211 will rotate in a counter-clockwise direction by means of spring 212, and depending projection 211c will press upon arm 202b to cause the locking lever 202 to pivot inwardly in the same manner as would be accomplished by depressing actuating plate 201 to urge the locking lever 202 against the action of spring 202c. This pivoting movement of lever 202 releases the cocked condition of the shutter release rod 203 and closes the electric power source switch SW1. Accordingly, the light measuring circuit of FIG. 2 will be actuated and thus the measured light intensity level of a photographic object will be converted to a charge in the storing condensor C1. Then, when shutter release rod 203 is lowered by means of the releasing operation of the self-timer device, then the shutter will be released in a known manner. As soon as travel of the front shutter curtain commences, charging of timing condensor C2 is also commenced, commensurate to a storing voltage in storing condensor C1. When the charging of timing condensor C2 reaches a given level, the electromagnet Mg will be energized by means of an output from the switching circuit B, and then the rear curtain of the shutter will start travelling, while the release gear 213 will start rotating from its position of FIG. 7. As a result, drive member 211 will keep operating to maintain switch SW1 closed until the shutter is fully closed, despite the length of the exposure time. In other words, in the case of an excessively long exposure time, even if the manipulating lever 207 is returned to its rest position, the electric power source switch SW1 will be maintained in its closed condition.

On the other hand, pin 213a engages arm end 211b of drive member 211 at the termination of rotation of release gear 213, as indicated in broken line in FIG. 8, to thereby rotate the drive member 211 in a clockwise direction against the action of a spring 212, thus releasing the arm 202b from its engagement with projection 211c. As a result, the locking lever 202 is now freed to pivot in a clockwise direction under the action of spring 202c as shown in FIG. 7. This movement causes the bent portion 202a to engage the notch portion 203a of shutter release rod 203, while the electric power source switch SW1 will be opened. The pin 211a is disengaged from arm end 210b of arresting member 210 and actuating lever 208, when manipulating lever 207 is in the rest position, such that arresting member 210 will rotate under the force of spring 210d to a position to engage stop pin 209, while the hooked portion 210a will engage pin 211a of drive member 211 to thereby grip same, thus maintaining a locked condition of the camera shutter and the open condition of the electric power source switch SW1.

It will also be appreciated that in this embodiment, after manual releasing member 215 has charged the self-timer device, the electric power source switch SW1 will be closed, and thus the closed condition of the switch will be maintained, until the completion of photographing. As a result, after the self-timer device is cocked, in case photographing is suspended, the rotation of manual releasing member 215 to align the index 215b with the graduation X will cause pin 215a to rotate drive member 211 in the clockwise direction against the action of spring 212, to thereby release the electric power source switch SW1. Upon resumption of photographing, when the index 215b is aligned with the graduation Y, the electric power source switch SW1 will be closed.

Figure 9:
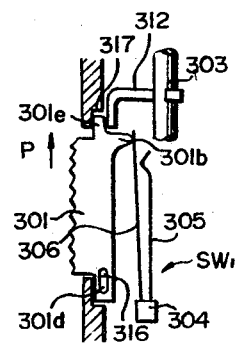
FIG. 9 is a side view of the essential parts of a fourth embodiment of the present invention.
Figure 10:
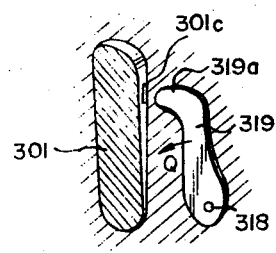
FIG. 10 is a perspective view of a modified form of the embodiment of FIG. 9.

FIGS. 9 and 10 disclose alternative embodiments of means for holding the switch actuating plate 301 in depressed condition after said plate 301 has been manually pressed inwardly to maintain power source switch SW1 closed and the locked condition released. These embodiments are used for remote control photographing, as when a long cable release is employed.

In FIG. 9, the actuating plate 301 is formed with an elongated slot 301d and is journalled in the body of a camera by means of a pivot shaft 316 extending slideably within the slot 301d. Because of elongated slot 301d, the actuating plate 301 is slidingly movable relative to shaft 316 and to the body of the camera. In addition, the actuating plate is formed with a projection 301e at its end opposite to the groove 301d, while the camera body is formed with a shoulder portion 317 adapted to engage projection 301e. Accordingly, after the actuating plate 301 has been pressed and switch SW1 closed and then the release rod 303 released from being locked, when the actuating plate 301 is raised in the direction of arrow P and the projection 301e engages the shoulder portion 317, then the closed condition of the electric power source switch SW1 and the released condition of a shutter will be maintained.

In the modified embodiment of FIG. 10, a holding lever 319 may be manually rotated in the direction of arrow Q, about a shaft 318, relative to the body of the camera. The holding lever 319 is formed with a projection 319a, while the actuating plate 301 is formed with a hole 301c which is adapted to receive the projection 319a, when the actuating plate 301 is pressed. Engagement of the projection 319a within hole 301c will hold the actuating plate 301 in a depressed condition until manually released.

Figure 11:
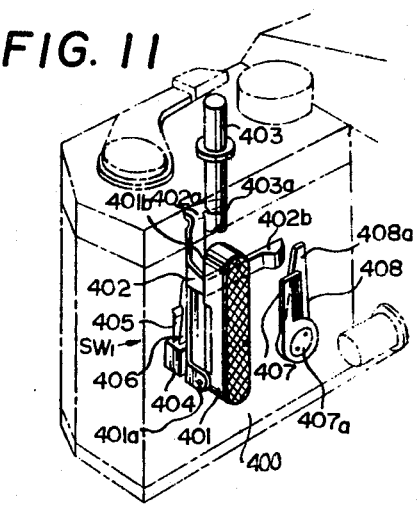
FIG. 11 is a perspective view of the essential parts of a fifth embodiment of the present invention.
Figures 12, 13:
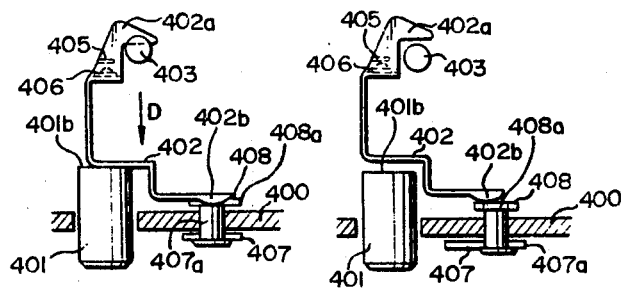
FIG. 12 is a top view of the mechanism of FIG. 11, showing the self-timer device in its rest position.
FIG. 13 is a top view of the mechanism of FIG. 11, showing the self-timer device in its cocked position.

The fourth embodiment of the present invention shown in FIGS. 11 to 13 is intended to solve the problem of consumption of electric cells, because of the connection of the electric power source with the load, as would result in use of the third embodiment, when the photographing is suspended while the self-timer device is in the cocked condition. In this fourth embodiment, there is used an electric control circuit as shown in FIG. 1.

To this end, when the cocking and setting lever of the self-timer device is either in the rest position or in the cocked position, the locked condition of the shutter release member and open condition of the electric power source switch are attained. As a result, the releasing operation of the shutter and the closing of the electric power source switch will be effected, before the shutter is released, in the course of the release and movement of the self-timer device from the cocked position to the rest position.

An actuating plate 401 journalled on a shaft 401a is biased to project a minute distance outwardly beyond a front plate 400 of the camera body. Actuating plate 401 is positioned to be pressed a given distance inwardly of the body proper of a camera against the aforesaid biasing force, by the user's gripping of the camera with his hands for manual photographing.

Provided in side-by-side relation to actuating plate 401 on the front plate 400, as in the case with the third embodiment, are a self-timer cocking lever 407 and an actuating lever 408 which are journalled on a shaft 407a for simultaneous rotation, such that rotation of the cocking lever 407 from the rest position of FIG. 11, in a counter-clockwise direction through a given angle, will set the self-timer device in its cocked position.

The locking member 402 in this instance is biased to move in the direction indicated by arrow D in FIG. 12 to engage an actuating surface 401b of the actuating plate 401. The locking member 402 is formed at one end with a projection 402b adapted to be engaged by end portion 408a of actuating lever 408, and a bent portion 402a at the other end thereof. Furthermore, locking member 402 is provided with a movable contact member 406 integrally or in engageable relation therewith, the aforesaid movable contact member 406 being provided in opposing relation to a fixed contact member 405 of the electric power source switch SW1. The aforesaid bent portion 402a is engageable with a notch 403a in shutter release rod 403, when locking member 402 is biased in the direction of arrow D.

The end portion 408a of actuating lever 408 is adapted to rotate in association with self-timer cocking lever 407, when said lever 407 is either in the rest position or in the cocked position. In this respect, the end portion 408a is disengaged from projection 402b of locking member 402, while said locking member is in a position wherein it is biased in the direction of arrow D. Furthermore, the electric power source switch SW1 is opened and release rod 403 is locked. Under such a condition, if the actuating plate 401 is pressed manually, then shutter release rod 403 will be released from being locked and the electric power source switch SW1 will be closed. On the other hand, when the aforesaid actuating plate 401 is released from being pressed, then release rod 403 will be locked again and the electric power source switch SW1 will be opened. Furthermore, in the condition where manipulating lever 407 is rotated from its rest position in a counter-clockwise direction as viewed in FIG. 11 and thereby the end portion 408a of actuating lever 408 engages projection 402b, the locking member 402 will be urged in a direction opposed to the direction of the arrow D against the biasing force thereon, the shutter release rod 403 released from being locked by the bent portion 402a and the electric power source switch SW1 closed. When manipulating lever 407 is further rotated in the counter-clockwise direction to its cocked position, then the end portion 408a of actuating lever 408 will be disengaged from projection 402b, the locking member 402 again moved in the direction of arrow D, the release rod 403 locked by means of bent portion 402a and the electric power source switch SW1 opened. In other words, when the self-timer device which has been set and locked is released, and cocking lever 407 is moved from its cocked position to its rest position, then the cocked shutter will be released and the electric power source switch SW1 closed in the course of the aforesaid movement of lever 407. The timing of closing of the electric power source switch SW1 is so set as to be effected immediately before the releasing of the shutter by means of the self-timer device.

In addition, light measuring data may be indicated in a meter M, when actuating plate 401 is pressed by the hands, as has been described earlier.

The fifth embodiment of the present invention, shown in FIGS. 14 to 18, is intended for use with an electric control circuit of the type shown in FIG. 2.

In the case of self-timer photography, photographing may possibly be suspended while the self-timer is in cocked condition, or the cocked self-timer device may be released and then the photographing may be suspended, with the operation of the self-timer device being stopped. In addition, the delayed time determined by the self-timer device for actuation of the shutter is not always constant and thus it is variable depending on varying photographing conditions encountered. The fifth embodiment lends itself to the aforesaid varying conditions, by controlling the actuation of the electric power source switch SW1 and the cocking operation of a shutter and by maintaining the electric power source switch SW1 in a closed condition until termination of the exposure.

Figure 14:
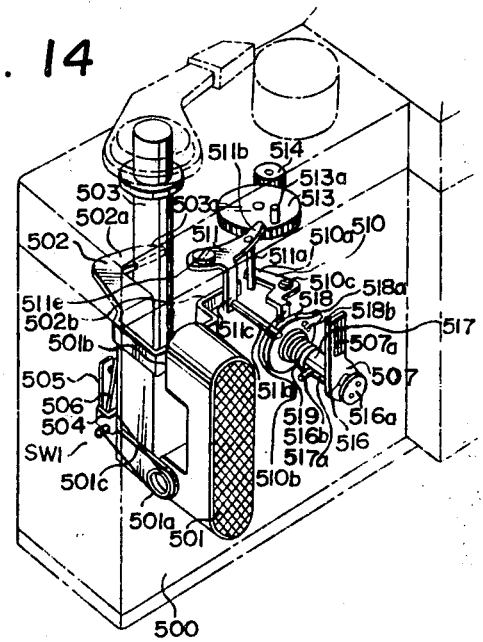
FIG. 14 is a perspective view of the essential parts of a sixth embodiment of the present invention.

In FIG. 14, the reference numeral 501 signifies an actuating plate which functions in the same manner as the actuating plates in the aforesaid embodiments and is rotatably journalled in a front plate 500 of the camera body by means of a pivot shaft 501a. Locking member 502 is journalled on pivot shaft 501a and biased by a spring 501c so as to rotate in a clockwise direction, as viewed in FIG. 14. Locking member 502 has a projecting arm 502b which abuts an actuating surface 501b of actuating plate 501, maintaining the actuating plate 501 projecting a given distance from the front plate 500 of the body of the camera. In the clockwise rotated position of the locking member 502, its bent end portion 502a engages a notch 503a in shutter release rod 503, restraining the shutter release rod 503 from being lowered. In addition, when the locking member 502 is in its outwardly biased position, the member 502 keeps the movable contact member 506 of the electric power source switch SW1 spaced from the fixed contact member 505 by using its resiliency, thus maintaining the switch SW1 opened.

The actuating plate 501 is pivoted inwardly in a counter-clockwise direction by being depressed when the camera is held by the hands for manual photographing, thereby disengaging the aforesaid bent portion 502a from notch 503a of shutter release rod 503, to release the locked shutter as well as to close the electric power source switch SW1.

A drive lever 511, formed with a depending arm 511c engageable with bent portion 502a, is rotatably journalled in the partition plate of the camera body by means of a shaft 511e, and is loaded by a strong spring (not shown) so as to rotate in a counter-clockwise direction as viewed in FIG. 14. The drive lever 511 has a depending pin 511a, and said depending arm 511c is formed with a forwardly projecting control pin 511d which is anchored therein. The arm end 511b of drive lever 511 is located in the path of rotation of pin 513a which is secured to and upstanding from a release gear 513.

An arresting lever 510 is rotatably mounted on the camera body by means of a shaft 510c. Formed on one arm of arresting lever 510 is a hooked portion 510a engageable with pin 511a, while the end of the other arm of lever 510 is formed with a bent portion 510b.

A shaft sleeve 517 which is rotatably journalled in the front plate 500 of the camera body has a plurality of elongated longitudinal slots 517a, while a self-timer cocking lever 507 is rigidly attached to one end of the shaft sleeve 517. A shaft 516 extends longitudinally and slideably through shaft sleeve 517 and has a self-timer release button 516a on its outer end. A pin 516b is provided on shaft 516, projecting laterally from opposite sides thereof, said pin 516b extending loosely and slideably through said elongated slots 517a.

An actuating disk 518 is rigidly attached to the opposite inner end of the shaft 516. Formed on the circumference of actuating disk 518 is a radially extending projection 518a. Also formed on disk 518 is pin 518b which projects perpendicularly from its outer face. Thus, when actuating disk 518 is rotated in a counter-clockwise direction, the aforesaid projection 518a will engage with control pin 511d of drive lever 511, while the projecting pin 518b will be engageable with bent portion 510b of arresting lever 510. Confined between the actuating disk 518 and the pin 516b is a coil spring 519 which urges the self-timer release button 516a to an outwardly projecting position.

Figure 15:
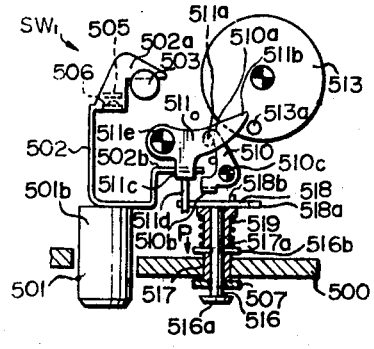
FIG. 15(A) is a top view of the mechanism of FIG. 14, showing the self-timer device in the rest position.
FIG. 15(B) is a front view of the self-timer cocking lever of the embodiment of FIG. 14.
Figure 15:
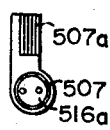
Figure 16:
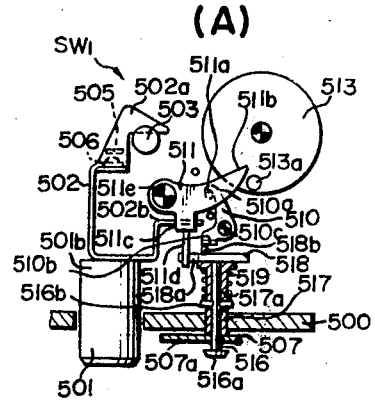
FIG. 16(A) is a top view of the mechanism of FIG. 14, showing the self-timer device locked in its cocked position.
FIG. 16(B) is a front view of the self-timer cocking lever in the position it assumes in FIG. 16(A)
Figure 16:
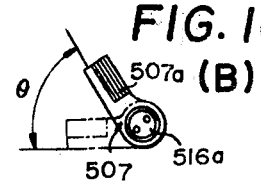
Figure 17:
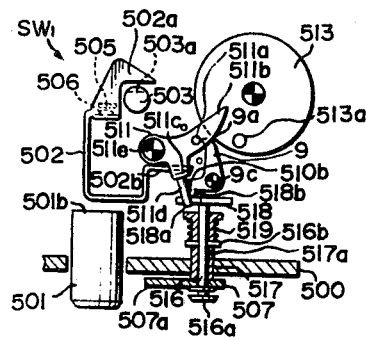
FIG. 17(A) is a top view of the mechanism of FIG. 14, showing the self-timer device after it has been released from its locked condition and moved to its rest position, and then actuated to a given extent.
FIG. 17(B) is a front view of the self-timer cocking lever in the position it assumes in FIG. 17(A)

The release gear 513 meshes with a gear 514 journalled on a rear curtain shaft of a focal plane shutter, and the pin 513a thereof is adapted to rotate in a counter-clockwise direction through about 360° from a position shown in FIGS. 14 and 15 to a position shown in FIG. 18(A), in association with the movement of the shutter rear curtain. At the end of its path of rotational movement, the pin 513a engages the arm end 511b of drive lever 511 which has been released from its locked condition by the arresting lever 510 as shown in FIG. 17(A), thereby rotating drive lever 511 in the clockwise direction as shown in FIG. 18(A), whereby pin 511a will engage the hooked portion 510a of arresting lever 510.

With the arrangement as shown in the fifth embodiment of FIGS. 14 to 18, the self-timer device will not be cocked, even if the shutter is cocked. On the other hand, when the self-timer cocking lever 507 is in its rest position as shown in FIGS. 14 and 15 (B), drive lever 511 will be locked by means of arresting lever 510 as shown in FIG. 15(A), and the electric power source switch SW1 will be opened by the locking lever 502. In addition, the bent portion 502a of locking lever 502 will engage notch 503a of shutter release rod 503 to thereby lock the shutter. In this respect, since projecting portion 507a of cocking lever 507 is in its rest position, facing upward as shown in FIG. 15(B), the projecting pin 518b of actuating disk 518 is positioned at a phase angle disengaged from bent portion 510b of arresting lever 510. As a result, even if the self-timer release button 516a is pressed, the locked condition of drive lever 511 by means of arresting lever 510 will not be released, maintaining the locking lever 502 in its locked position. Accordingly, only when a camera is held by the hands for manual photographing and the actuating plate 501 is pressed, the actuating surface 501b will depress the locking lever 502, the electric power source switch SW1 will be closed and the locked condition of the shutter will be released.

Subsequently, when self-timer cocking lever 507 is rotated in the counter-clockwise direction for self-timer photographing from a position shown in FIG. 15(B) to a position shown in FIG. 16(B) to enter the cocking angle θ of the self-timer device, the self-timer device will be cocked through a given angle, whereupon the projecting pin 518b of actuating disk 518 will be turned through a sufficient angle so that it might engage the bent portion 510b of arresting lever 510. However, even if the self-timer device is cocked in this manner, there still remains a possibility of photographing being suspended. For this reason, arresting lever 510 as shown in FIG. 16(A) locks drive lever 511 and the electric power source switch SW1 is maintained opened and the shutter locked, so long as the actuating plate 501 is not pressed.

Then, when the self-timer release button 516a is pressed for releasing the self-timer device, the projecting pin 518b will engage the bent portion 510b as shown in FIG. 17(A) to thereby rotate the arresting lever 510 in a clockwise direction, such that the hooked portion 510a will be disengaged from pin 511a of drive lever 511, and then the drive lever 511 is rotated in a counter-clockwise direction as to maintain the aforesaid disengaged condition. However, if drive lever 511 is rotated through a small angle, the control pin 511d thereof will be interrupted from rotation due to projection 518a of actuating disk 518 which has been rotated within the cocking angle θ of the self-timer device as shown in FIG. 16(B), whereby the electric power source switch SW1 will be maintained opened with the shutter remaining locked. On the other hand, when cocking lever 507 rotates back from a position within the cocking angle θ, then the control pin 511d will no longer be blocked by projecting portion 518a, and drive lever 511 will be free to rotate in a counter-clockwise direction as shown in FIG. 17(A), allowing locking lever 502 to close the electric power source switch SW1, and release the cocked condition of a shutter.

Figure 18:
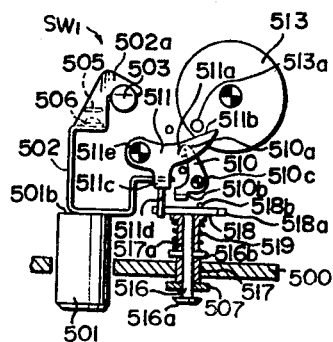
FIG. 18(A) is a top view of the mechanism of FIG. 14, showing the self-timer device when the exposure has been terminated in self-timer photographing.
FIG. 18(B) is a front view of the self-timer cocking lever in the position it assumes in FIG. 18(A).
Figure 17:
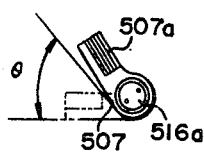
Figure 18:
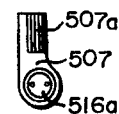

Accordingly, when the self-timer device is released to given extent and cocking lever 507 is rotated through a given angle toward the rest position, then the shutter will be released by means of a known mechanism, while an electric control circuit for the electric shutter as shown in FIG. 14 will be operated by means of an electric power source switch SW1 which is closed during that time. Then, when the electromagnet Mg releases the rear curtain from being locked to thereby cause same to travel, the release gear 513 will be rotated and the pin 513a thereof will abut and engage the arm end 511b of drive lever 511 to thereby rotate same in the clockwise direction against its biased tendency, as shown in FIG. 18, thereby opening the electric power source switch SW1 and locking the shutter. On the other hand, cocking lever 507 will return to its rest position prior to the aforesaid locking operation of a shutter, in case the exposure time is relatively long, while cocking lever 507 will return to its rest position after the aforesaid locking operation of the shutter, in case the exposure time is relatively short.

Furthermore, in case photographing is suspended after the self-timer device has been released by means of the release button 516a and thus the cocking lever 507 has rotated back from the cocking angle θ, then the electric power source switch SW1 will be maintained closed, while projection 518a of actuating disk 518 will engage control pin 511d of drive lever 511 due to the rotation of cocking lever 507 back to the cocking position. However, when the cocking lever is rotated in the counter-clockwise direction from a position shown in FIG. 17(A) to thereby bring drive lever 511 into engagement with arresting lever 510 to lock same in the positions shown in FIG. 16(A) and (B), then the electric power source switch SW1 will again be opened and the shutter locked, such that the aforesaid condition will be maintained unless the self-release button 516a is pressed.

While we have shown and described certain preferred embodiments of the present invention, it is to be distinctly understood that the invention is not limited thereto, but may be otherwise variously embodied within the scope of the following claims.

We claim:

1. A photographic camera having an electric shutter including an electric power source and an electric control circuit, comprising:
   a normally open electric power switch adapted to open or close the connection of said electric power source with at least a light measuring circuit incorporated in said electric control circuit;
   a camera casing;
   a manually engageable switch control member provided at said camera casing and moveable between a first position for opening said power switch and a second position depressed from said first position for closing said power switch;
   means for biasing said switch control member toward said first position thereof to normally position said switch control member at said first position;
   a shutter release member;
   locking means moveable between a first position for preventing the operation of said shutter release member and a second position for allowing the operation of said shutter release member, said locking means being positioned at said first position with said switch control member at said first position thereof and positioned at said second position with said switch control member at said second position thereof.

2. A photographic camera having an electric shutter as set forth in claim 1, which further comprises means for locking said switch control member in its second position.

3. A photographic camera having an electric shutter, as set forth in claim 1 which further includes:
   a self-timer cocking member, said cocking member being moveable between a rest position and a cocked position; and
   an actuating member provided separately from said switch control member and moveable between a first rest position and a second operative position for closing said electric power switch, said actuating member being adapted to be moved to said second operative position in response to movement of said self-timer cocking member.

4. A photographic camera having an electric shutter as set forth in claim 3, wherein said actuating member is adapted to be temporarily moved to said second operating position, while said cocking member is moved from its cocked position to its rest position.

5. A photographic camera having an electric shutter as set forth in claim 3, wherein said actuating member is adapted to be locked in said second operating position with said cocking member in its cocked position and moved to said first rest position with said cocking member in its rest position.

6. A photographic camera having an electric shutter including an electric power source and an electric control circuit, comprising:

a normally open electric power source switch adapted to open and close the connection of at least a light measuring circuit incorporated in said electric control circuit with said electric power source;

a drive member adapted to operate so as to close said electric power source switch against its normally open tendency;

a self-timer cocking member moveable between a rest position and a cocked position;

an arresting member for engaging and holding said drive member in a position disengaged from said power source switch when said cocking member is in its rest position, and for releasing said arrested drive member to close said power source switch in association with the movement of said cocking member from its rest position to its cocked position; and means for returning said drive member to a position in engagement with said arresting member in association with termination of the exposure.

7. A photographing camera having an electric shutter including an electric power source and an electric control circuit, comprising:

a self-timer cocking member moveable between a rest position and a cocked position;

a self-timer release member for releasing the self-timer cocking member for movement from said cocked position to said rest position;

an electric power source switch connected between at least a light measuring circuit incorporated in said electric control circuit and said electric power source;

a switch drive member moveable between a first position to open said electric power source switch and a second position to close said electric power source switch, and normally urged toward said second position;

an arresting member for locking said switch drive member in said first position;

a releasing member for releasing said switch drive member from locked engagement with said arresting member, in response to the releasing operation of said self-timer release member, when said cocking member is in its cocked position, said releasing member being moveable in association with said cocking member; and means for returning said switch drive member from said second position to said first position in response to the closing of the shutter against the tendency of said switch drive member to be urged in engagement with said arresting member.

8. A photographic camera having an electric shutter including an electric power source and an electric control circuit, comprising:

an electric power source switch adapted to open or close the connection of at least a light measuring circuit incorporated in said electric control circuit with said electric power source;

a self-timer cocking member moveable between a rest position and a cocked position;

means for closing said electric power source switch in relation to the position of said self-timer cocking member; and means for opening said electric power switch in association with termination of the exposure.

9. A photographic camera having an electric shutter, an electric power source, and an electric control circuit including a light measuring circuit connectable to said electric power source, said camera comprising:

a shutter release member having an inoperative position from which it is moved for actuation of said electric shutter;

a locking member for locking said release member in said inoperative position, thereby restraining operation of said shutter;

a normally open electric power source switch adapted to open or close the connection of said electric power source with at least said light measuring circuit;

a first actuating member moveable between a first rest position and a second operating position for closing said electric power source switch, said actuating member being mounted at the side of the photographic camera and positioned to be engaged and moved to said second position by the hands of the user holding said camera for manual photographing;

means for moving said locking member for releasing said shutter release member from its locked position, when said actuating member is in said second position;

a self-timer cocking member moveable from a cocked position to a rest position during a designated time lapse interval after movement of said shutter release member from its inoperative position;

a second actuating member provided separately from said first actuating member and having a first rest position and a second operating position in which it is adapted to close said electric power source switch and release the shutter release member from its locking engagement by said locking member;

means for biasing said second actuating member to its second operating position;

means for moving said second actuating member from its second operating position to its first rest position against the action of said means for biasing said actuating member; and an arresting member for arresting said second actuating member in its first rest position and releasing said arrested condition in association with the movement of said cocking member from its rest position to its cocked position.

10. A photographic camera having an electric shutter, an electric power source and an electric control circuit including a light measuring circuit connectable to said electric power source said camera comprising:

a shutter release member having an inoperative position from which it is moved for actuation of said electric shutter;

a locking member for locking said release member in said inoperative position, thereby restraining operation of said shutter;

a normally open electric power source switch adapted to open or close the connection of said electric power source with at least said light measuring circuit;

a first actuating member moveable between a first rest position and a second operating position for closing said electric power source switch, said actuating member being mounted at the side of the photographic camera and positioned to be engaged and moved to said second position by the hands of the user holding said camera for manual photographing;

means for moving said locking member for releasing said shutter release member from its locked position, when said actuating member is in said second position;

a self-timer cocking member moveable from a clocked position to a rest position during a designated time lapse interval after movement of said shutter release member from its inoperative position;

a second actuating member provided separately from said first actuating member and having a first rest position and a second operating position in which it is adapted to close said electric power source switch and release the shutter release member from its locking engagement by said locking member;

a drive member for driving said second actuating member from its first rest position to its second operating position;

means for moving said second actuating member from its second operating position to its first rest position against the action of said drive member in association with termination of the exposure by said electric shutter;

an arresting member biased to remain in an arrested position in engagement with said second actuating member when said second actuating member is in its first rest position, and moveable to a releasing position out of engagement with said second actuating member; and means for driving said arresting member to its releasing position in association with the movement of said cocking member from its rest position to its cocked position.

11. A photographing camera having an electric shutter including an electric power source and an electric control circuit, comprising:

a self-timer cocking member adapted to move between a rest position and a cocked position; a self-timer release member;

an electric power source switch connected between at least a light measuring circuit incorporated in said electric control circuit and said electric power source;

a switch drive member moveable between a first position to open said electric power source switch and a second position to close said electric power source switch, and normally urged toward said second position;

a first arresting member for locking said switch drive member in said first position;

a releasing member for releasing said switch drive member from locked engagement with said first arresting member, in response to the releasing operation of said self-timer release member, when said self-timer cocking member is in its cocked position, said releasing member being moveable in association with said self-timer cocking member;

means for returning said switch drive member from said second position to said first position in response to the closing of the shutter against the tendency of said switch drive member to be urged in engagement with said first arresting member; and a second arresting member moveable between an arresting position to restrain said switch drive member, which has been released from said first arresting member, from its tendency to move to the second position, and a releasing position to release said switch drive member for movement to said second position, in association with said self-timer cocking member, said second arresting member being adapted to move from said arresting position to said releasing position in the course of said self-timer cocking member moving from its cocked position to its rest position.

\* \* \* \* \*